United States Patent [10] Patent No.: US 12,345,195 B2
Drehobl et al. (45) Date of Patent: Jul. 1, 2025

(54) PREVENTION OF BACKFIRING OF A PRE-CHAMBER GAS VALVE OF A COMBUSTION ENGINE

(71) Applicant: Caterpillar Energy Solutions GmbH, Mannheim (DE)

(72) Inventors: Enrico Drehobl, Rellingen (DE); Friedrich Schaefer, Edenkoben (DE)

(73) Assignee: Caterpillar Energy Solutions GmbH, Mannheim (DE)

( * ) Notice: Subject to any disclaimer, the term of this patent is extended or adjusted under 35 U.S.C. 154(b) by 0 days.

(21) Appl. No.: 18/556,539

(22) PCT Filed: Apr. 12, 2022

(86) PCT No.: PCT/EP2022/025146
§ 371 (c)(1),
(2) Date: Oct. 20, 2023

(87) PCT Pub. No.: WO2022/223146
PCT Pub. Date: Oct. 27, 2022

(65) Prior Publication Data
US 2024/0209768 A1 Jun. 27, 2024

(30) Foreign Application Priority Data
Apr. 20, 2021 (GB) .................. 2105640

(51) Int. Cl.
*F02B 19/10* (2006.01)
*F02M 21/02* (2006.01)
(52) U.S. Cl.
CPC ....... *F02B 19/1019* (2013.01); *F02M 21/023* (2013.01)
(58) Field of Classification Search
CPC .................. F02B 19/1066; F02B 19/1019; F02M 21/023
See application file for complete search history.

(56) References Cited

U.S. PATENT DOCUMENTS 1,384,686 A 7/1921 Christmas
4,598,863 A * 7/1986 Kanesaka .............. F02M 47/02
239/96

(Continued)

FOREIGN PATENT DOCUMENTS

EP 3061962 A1 8/2016
FR 842032 A 6/1939

OTHER PUBLICATIONS

International Search Report related to Application No. PCT/EP2022/025146; reported on Apr. 8, 2022.

(Continued)

*Primary Examiner* — Gonzalo Laguarda

(57) ABSTRACT

The present invention pertains to arrangements for a pre-chamber of a combustion engine as well as pre-chambers comprising such arrangements, in particular to avoid or impair backfiring or flashbacks of a combustible mixture and/or to enable a flame retardation within a respective pre-chamber. Accordingly, an arrangement for a pre-chamber gas valve of a combustion engine, preferably a gas engine, is suggested, which comprises a housing having an outer surface and comprising a channel, wherein a first end of the channel is in fluid communication with the outer surface and a second end of the channel is connectable to a valve seat of the pre-chamber gas valve. The arrangement furthermore comprises a plurality of protrusions extending radially outward from the outer surface of the housing. The first end of the channel is arranged upstream of the second end of the channel and downstream of the protrusions, wherein the protrusions are spaced apart from each other in a circumferential direction and define a respective cavity between respective adjacent protrusions, each cavity having an extension being larger in a radial direction and/or axial direction than an extension in the circumferential direction.

17 Claims, 2 Drawing Sheets

(56) References Cited

U.S. PATENT DOCUMENTS

| | | | |
|---|---|---|---|
| 4,620,516 A | 11/1986 | Reum et al. | |
| 4,892,070 A * | 1/1990 | Kuhnert | F02F 1/242 |
| | | | 123/274 |
| 5,609,130 A * | 3/1997 | Neumann | F02B 19/1004 |
| | | | 123/267 |
| 6,644,961 B2 | 11/2003 | Brooker | |
| 6,901,905 B2 | 6/2005 | Weickel et al. | |
| 8,858,224 B2 | 10/2014 | Mungas et al. | |
| 8,925,517 B2 * | 1/2015 | Adams | B23Q 5/033 |
| | | | 123/258 |
| 2009/0173393 A1 | 1/2009 | Cooper et al. | |
| 2016/0245151 A1* | 8/2016 | Yuuki | F02B 19/08 |
| 2016/0252005 A1 | 9/2016 | Jacob | |
| 2016/0252006 A1 | 9/2016 | Jacob et al. | |
| 2020/0191096 A1 | 1/2020 | Masahiro et al. | |

OTHER PUBLICATIONS

GB Search Report related to Application No. 2105640.3; reported on Sep. 15, 2021.

* cited by examiner

PREVENTION OF BACKFIRING OF A PRE-CHAMBER GAS VALVE OF A COMBUSTION ENGINE

CROSS-REFERENCE TO RELATED APPLICATION

This Application is a 35 USC §371 US National Stage filing of International Application No. PCT/EP2022/025146 filed on Apr. 12, 2022 which claims priority under the Paris Convention to Great Britain Patent Application No. 2105640.3 filed on Apr. 20, 2021.

TECHNICAL FIELD

The present invention pertains to arrangements for a pre-chamber of a combustion engine as well as pre-chambers comprising such arrangements, in particular to avoid or impair backfiring or flashbacks of a combustible mixture and/or to enable a flame retardation within a respective pre-chamber.

Technological Background

In common pre-chambers of combustion engines that are flushed or purged with a combustible fluid, e.g. a gas, one or more valves are provided to ensure that the required gas mass flow is established or maintained. If the valve closure is insufficient and no longer closes completely, e.g. due to sealing defects and/or timing or operating inconsistencies, a combustible mixture or exhaust gases from the combustion chamber and having high temperatures may enter the supply of the combustible fluid of the pre-chamber valve, which may result in undesirable effects such as re-ignition, backfiring and/or soot formation, i.e. causing a thermal black process.

Accordingly, there is a need to reduce risks associated with inconsistencies of pre-chamber valve functioning and to at least partially abrogate the above unfavorable conditions.

SUMMARY OF THE INVENTION

Starting from the prior art, it is an objective to provide a new and inventive arrangement for a pre-chamber gas valve. In particular, it may be an objective to provide an arrangement which avoids or impairs backfiring or flashbacks of a combustible mixture and/or enables a flame retardation within a respective pre-chamber.

This objective is solved by means of an arrangement for a pre-chamber gas valve of a combustion engine with the features of claim 1. Preferred embodiments are set forth in the present specification, the Figures as well as the dependent claims.

Accordingly, an arrangement for a pre-chamber gas valve of a combustion engine, preferably a gas engine, is suggested, which comprises a housing having an outer surface and comprising a channel, wherein a first end of the channel is in fluid communication with the outer surface and a second end of the channel is connectable to a valve seat of the pre-chamber gas valve. The arrangement furthermore comprises a plurality of protrusions extending radially outward from the outer surface of the housing. The first end of the channel is arranged upstream of the second end of the channel and downstream of the protrusions, wherein the protrusions are spaced apart from each other in a circumferential direction and define a respective cavity between respective adjacent protrusions, each cavity having an extension being larger in a radial direction and/or axial direction than an extension in the circumferential direction.

Furthermore, a pre-chamber for a combustion engine is suggested, comprising the arrangement according to the invention and a body having a wall defining an inner surface and accommodating the arrangement within said wall, wherein the wall comprises a gas inlet and a gas outlet, and wherein the gas inlet is arranged upstream of the plurality of protrusions and the gas outlet is fluidly connectable to the second end of the channel via a pre-chamber gas valve.

Furthermore, a combustion engine, preferably a gas engine, comprising a pre-chamber according to the invention is suggested.

BRIEF DESCRIPTION OF THE DRAWINGS

The present disclosure will be more readily appreciated by reference to the following detailed description when being considered in connection with the accompanying drawings in which.

DETAILED DESCRIPTION OF PREFERRED EMBODIMENTS

Figure 1:
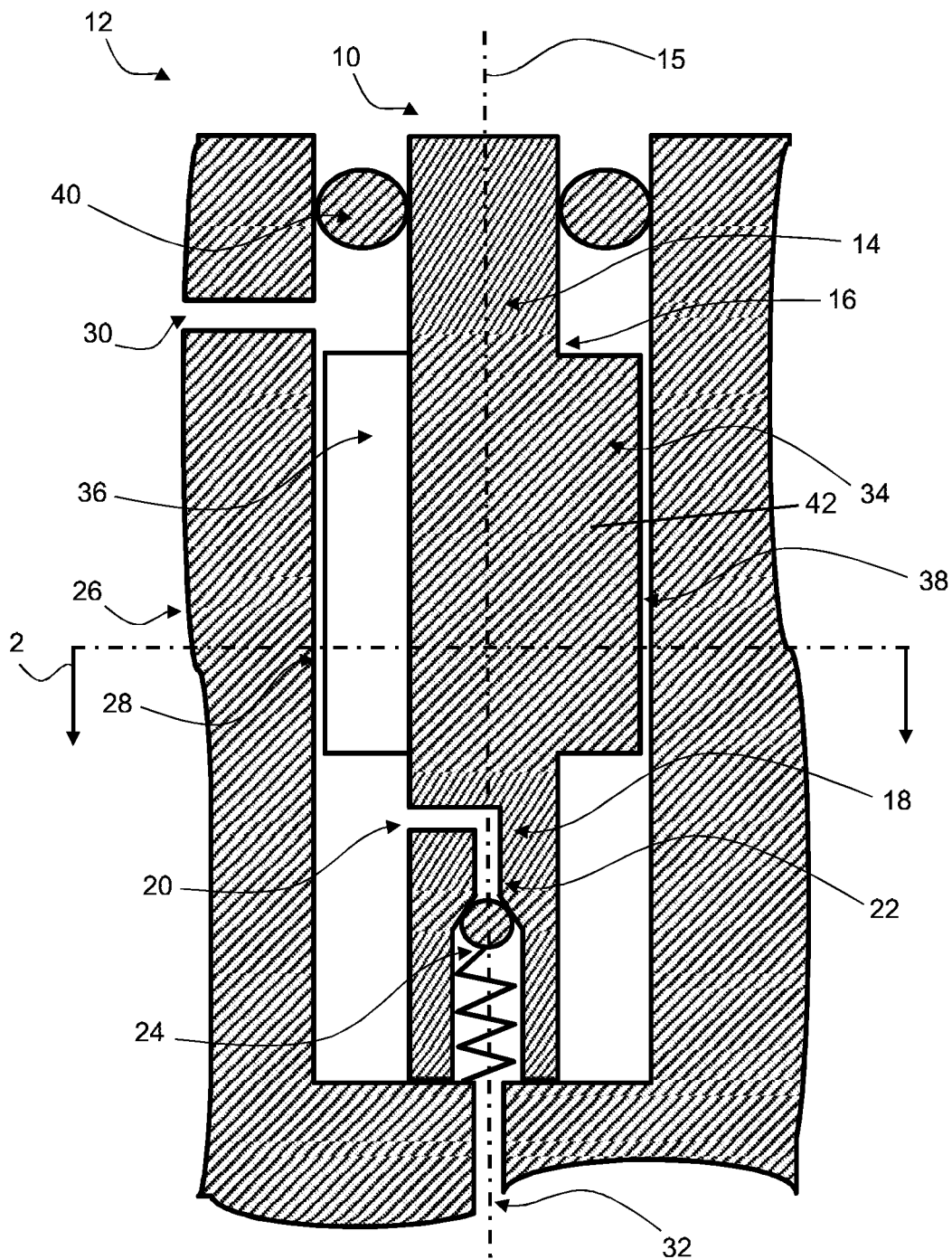
FIG. 1 shows a schematic depiction of an arrangement mounted in a pre-chamber in a longitudinal section.

In the following, the invention will be explained in more detail with reference to the accompanying figures. In the Figures, like elements are denoted by identical reference numerals and repeated description thereof may be omitted in order to avoid redundancies.

In FIG. 1, a schematic depiction of an arrangement 10 is shown along a longitudinal section. The arrangement 10 is mounted in a pre-chamber 12 of a combustion engine (not shown), e.g. a gas engine, wherein the pre-chamber 12 is shown only in part. The arrangement 10 comprises a housing 14 and a plurality of protrusions 34, which are arranged along an outer surface 16 of the housing 14 and extend radially, i.e. in a direction perpendicular to the longitudinal axis 15 defined by the housing 14 and the arrangement 10 as a whole. The housing 14 and the protrusions 34 are formed of a solid and filled material, such as a metal or a ceramic material, so as to provide improved thermal conductivity and heat dissipation in the mounted state and during operation of the combustion engine. According to the embodiment, the protrusions 34 and the housing 14 are formed as a single piece, as indicated with the hatching. However, it will be understood that this is not limiting and that other configurations having e.g. a separated housing are possible.

Figure 2:
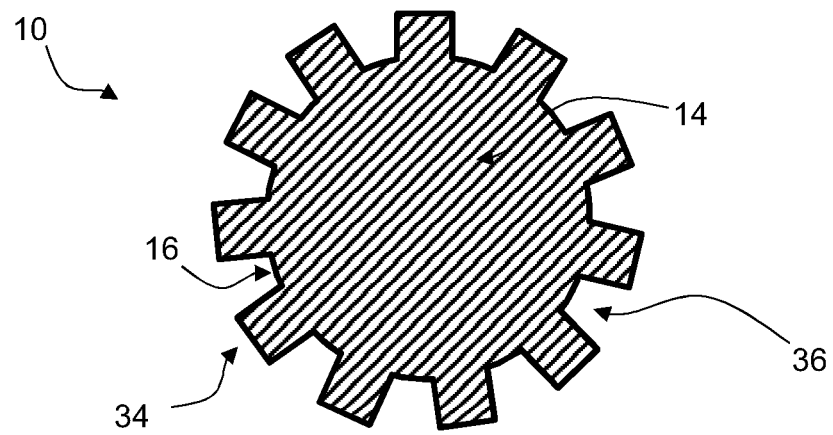
FIG. 2 shows a schematic depiction of an arrangement according to an embodiment in a top sectional view.

The protrusions 34 furthermore extend along the longitudinal or axial direction 15 of the housing 14, i.e. at the outer surface 16 thereof, and, in a preferred embodiment, are evenly spaced apart from each other in the circumferential direction, as shown in FIG. 2. The adjacent protrusions 34 define respective cavities 36 between adjacent protrusions 34 and between the respective protrusion 34 and the outer surface 16 of the housing 14, as indicated by the lack of hatching on the left side of the housing for a protrusion 34 that is not within the same plane.

According to the present embodiment, the protrusions 34 are arranged upstream of a channel 18. The channel 18 comprises a first end 20 and a second end 22, wherein the first end 20 is in fluid communication with the outer surface 16 and the second end 22 of the channel 18 is connected to a valve 24, e.g. via a valve seat of the valve 24. The first end 20 of the channel 18 is arranged upstream of the second end 22 of the channel 18 and, according to the present embodiment, downstream of the protrusions 34.

The channel 18 hence provides that a combustible fluid passing along the outer surface 16 of the housing 14 is directed towards the valve 24 to provide a predefined volume and mass flow towards a downstream combustion area of the combustion engine.

The combustible fluid is provided via the pre-chamber 12, which comprises a body 26 having a gas inlet 30 and a gas outlet 32, wherein the arrangement 10 is accommodated in the body 26. More particularly, the body 26 comprises a wall defining an inner surface 28 which is directly adjacent to the respective protrusions. The body 26 and the arrangement 10 may be in direct contact with each other or may form a respective cavity 38 based on a predefined tolerance, which is schematically depicted by the gap. The arrangement 10 is accommodated within the body 26 such that the second end 22 of the channel 18 is in fluid communication with the gas outlet 32 and the first end 20 of the channel 18 is in fluid communication with the gas inlet 30 via the cavities 36 formed by the protrusions 34 and the outer surface 16.

In order to avoid that the combustible fluid leaks out of the pre-chamber 12, e.g. when the pre-chamber comprises an open end not closed by the arrangement 10 (a top end in FIG. 1), a sealing 40 is provided, e.g. a sealing ring, which is arranged between the gas inlet 30 and the protrusions 34 being in closest proximity to the gas inlet 30.

The extension of the protrusions 34 along the outer surface 16 in the longitudinal direction provides that a fluid entering the pre-chamber 12 via the downstream valve 24, e.g. towards a normally upstream direction, is biased into the cavities 36. Within said cavities 36 heat may be absorbed by the surrounding protrusions 34 and the housing 14 via the outer surface 16. Thereby, the temperature of a combustible mixture or exhaust gases inadvertently entering the pre-chamber 12 via the valve 24 may be significantly reduced due to the large surface to volume ratio. Accordingly, the risk of a backfiring occurrence may be effectively reduced. At the same time, the dimensioning supports or at least does not impair or restrict a predefined volume flow of a combustible fluid towards the valve 24, e.g. under normal operating conditions of the combustion engine.

In FIG. 2 a schematic depiction of the arrangement 10 according to the embodiment of FIG. 1 is shown in a top sectional view, as indicated with the intersecting line and corresponding reference numeral 2 in FIG. 1. Accordingly, the housing 14 and the plurality of protrusions 34 are integrally formed, i.e. made of a single piece. The protrusions 34 extend radially and along a circumference of the housing 14, i.e. along the outer surface 16, and also extend along the axial or longitudinal direction of the housing 14 so as to form corrugated ribs or fins, as shown in FIG. 1.

The dimensioning is only schematically depicted. However, it is schematically shown that the radial extension of the cavities 36 is larger than their smallest extension in the circumferential direction, i.e. in the region in closer proximity of the outer surface 16 than at the outer most radial extension. Thereby, a larger surface to volume ratio may be provided so as to improve heat adsorption by the protrusions 34 and the housing 14 via the outer surface 16. The protrusions 34 are furthermore depicted as having a truncated V-shaped extension starting from the outer surface 16 of the housing 14. However, other shapes of the protrusions 34 are possible and it is alternatively possible that the extension of the cavities 36 in the circumferential direction is essentially constant, wherein the radial extension of the cavities 36 may be larger or equal to the circumferential extension and wherein the extension of the cavities 36 in the longitudinal direction is larger than an extension in the circumferential direction, as schematically shown in FIG. 1.

Figure 3:
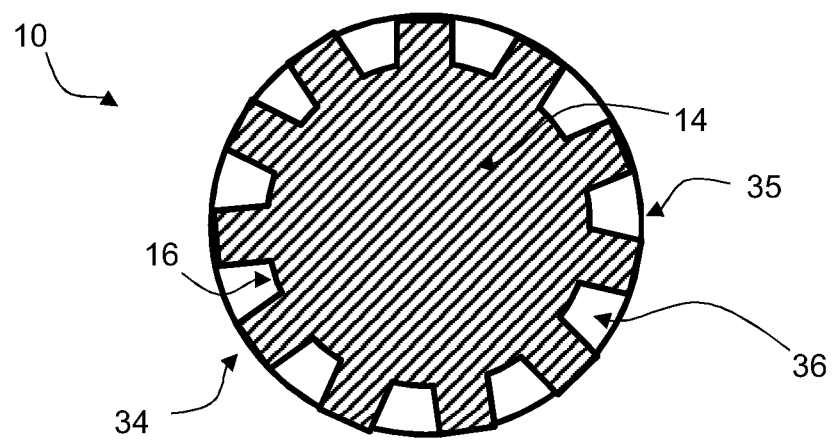
FIG. 3 shows a schematic depiction of an arrangement according to another embodiment in a top sectional view.

Instead of extending continuously in the longitudinal direction, the protrusions 34, e.g. formed as ribs or fins, may furthermore be spaced apart from each other in the axial direction and may hence be formed by a plurality of layers or rows of protrusions 34, The protrusions 34 or ribs or fins may furthermore be staggered to each other between rows of protrusions 34 in the axial direction, as shown in FIG. 3. In this staggered embodiment, protrusions 34 of an adjacent layer are depicted with reference numeral 35 and are hence not in plane with the protrusions 34 shown with the hatching. The protrusions 34 are evenly spaced apart from each other and define respective cavities 36 between adjacent protrusions 34 and the outer surface 16 of the housing 14 as well as with the protrusions 35 of the adjacent layer. The spacing and dimensioning as well as the number of protrusions 34 are to be understood as exemplary.

It will be obvious for a person skilled in the art that these embodiments and items only depict examples of a plurality of possibilities. Hence, the embodiments shown here should not be understood to form a limitation of these features and configurations. Any possible combination and configuration of the described features can be chosen according to the scope of the invention.

This is in particular the case with respect to the following optional features which may be combined with some or all embodiments, items and/or features mentioned before in any technically feasible combination.

An arrangement for a pre-chamber gas valve of a combustion engine, preferably a gas engine, is provided.

Such arrangement comprises a housing having an outer surface and comprising a channel, a first end of the channel being in fluid communication with the outer surface and a second end of the channel being connectable to a valve seat of the pre-chamber gas valve. The arrangement furthermore comprises a plurality of protrusions extending radially outward from the outer surface of the housing. The first end of the channel is arranged upstream of the second end of the channel and downstream of the protrusions, wherein the protrusions are spaced apart from each other in a circumferential direction and define a respective cavity between respective adjacent protrusions, each cavity having an extension being larger in a radial direction and/or axial direction than an extension in the circumferential direction.

The particular dimensioning of the cavities formed by the protrusions has the advantage that a spacing towards an inner surface of a wall of a body of the pre-chamber, which accommodates or receives the arrangement, may be minimized, e.g. in case of a larger radial extension. Thereby, a fitting of the arrangement within the wall is facilitated. For example, the radial extension, i.e. perpendicular to a longitudinal direction of the housing, may be chosen so as to provide an interference fit with the wall of the body. Furthermore, this ensures that a fluid pathway between the arrangement and the body of the pre-chamber, i.e. between the respective protrusions and the inner surface of the wall, is restricted, such that a reverse flow towards the supply of the combustible fluid is essentially avoided at the interface between the arrangement and the body.

The dimensioning furthermore provides a large contacting surface for a fluid entering the pre-chamber in a reverse direction. This provides that heat from the fluid inadvertently entering the pre-chamber may be absorbed by the protrusions and the housing and is effectively dissipated, such that the temperature of the fluid is significantly reduced. The smaller extension in a circumferential direction may provide a restriction of the flow while at the same time preferably being adapted to a predefined volume flow towards a downstream end of the valve so as to support the required conditions for the engine performance.

The restriction and the large contact or heat conducting surface hence provide that even in the case of a combustible mixture or exhaust gas entering the pre-chamber, the corresponding temperature and penetration depth may be reduced, such that a backfiring or spontaneous re-ignition towards the combustible fluid supply may be avoided or the corresponding risk is at least significantly reduced. Accordingly, the arrangement may hence form a flame arrester, e.g. from a downstream valve to an upstream combustible fluid supply.

The larger extension in the radial direction relative to an extension in the circumferential direction is to be understood such that the cavity may comprise an extension in the circumferential that is equal to the radial extension, but comprises a region having a smaller extension in the circumferential direction. For example, if the housing comprises an essentially cylindrical shape, the protrusions may define a cavity having a truncated V-shape extending from the outer surface of the housing as seen in a cross-sectional and/or top view of the arrangement. In such a configuration, the cavity may have a smaller circumferential extension along the outer surface while having a circumferential extension at the outer(most) radial extension being essentially the same compared with the radial extension of the cavity. In other words, it is not necessary that the entire cavity comprises a smaller circumferential extension relative to the radial extension, although such configuration is also possible. For example, the protrusions may have a shape, e.g. a truncated V-shape, defining a cavity with an essentially continuous width or extension in the circumferential direction.

A larger extension in the axial or longitudinal direction of the housing and arrangement as a whole furthermore increases the contact surface with the fluid. Thereby, a larger heat conducting surface may be provided, which facilitates heat dissipation from the fluid entering the pre-chamber while supporting an upstream to downstream flow from the supply of the combustible fluid to the valve and downstream combustion area. The protrusions may e.g. be formed as ribs or fins having e.g. a rounded or rectangular shape.

Preferably, the housing and/or the at least one protrusion are formed as a solid body, preferably made of a ceramic and/or metal. Thereby, heat dissipation and absorption may be improved and the temperature reduction of a fluid inadvertently entering the pre-chamber in a reverse direction may be further facilitated.

The arrangement may be formed as a separate component that may be mechanically and fluidically coupled to a corresponding component of a pre-chamber (valve), e.g. within a corresponding cavity adapted to accommodate the housing and the protrusions. The housing and the protrusions may also be formed as separate or individual components, wherein the protrusions may e.g. be attached to the outer surface of the housing, e.g. using a frictional fitting or positive fitting. Preferably, the at least one protrusion is integrally formed with the housing or is formed from a single piece with the housing. Thereby, the arrangement may form a single replacement part and the components are directly adapted to each other, both avoiding a relative movement between the components and improving the heat dissipation or heat transfer. The protrusions may e.g. be provided by means of (metal) forming, shaping, die cutting, milling, and/or punching of the housing. Accordingly, the corresponding cavities may also be formed by a plurality of grooves or channels at the outer surface of the housing.

The protrusions may have a variety of shapes and dimensions. Preferably, the protrusions extend in an axial direction of the housing and/or along a circumferential direction of the housing.

Accordingly, one or more protrusions may form a corrugated arrangement, defining fins and/or ribs. The corresponding cavities may also be formed by a plurality of grooves or channels at the outer surface of the housing. An extension at least in part in a circumferential direction, as an alternative to e.g. protrusions formed of a (metal) sheet material, may furthermore restrict the penetration depth of a fluid entering the pre-chamber from the valve portion of the pre-chamber while providing an improved heat dissipation capacity. The protrusions are thereby not restricted to an extension within a single plane, but may also form a helical 42 or spiral shape in at least a portion.

The arrangement according to any of the preceding claims, wherein at least a portion of the protrusions is spaced apart in an axial direction of the housing. For example, the protrusions may e.g. form corrugated ribs or fins in an axial (and radial) direction that have a predefined spacing in a circumferential direction and may e.g. form ribs or fins in a staggered arrangement, both in the axial and circumferential direction. The arrangement may e.g. comprise a first set of protrusions that may be spaced apart in a longitudinal direction from at least a second set of protrusions, wherein adjacent protrusions are spaced apart in a circumferential direction, and wherein the first set and second set are preferably arranged in a staggered formation relative to each other, i.e. in a cross-sectional view.

The adjacent protrusions may also be spaced apart in an axial direction of the housing, wherein the adjacent protrusions are separated from each other or connected to each other, preferably via an extension of the adjacent protrusions. For example, the protrusions may be formed as a single piece in the circumferential direction, e.g. a ring shape, which may be integrated in, form fitted, e.g. snap-fit, or friction fitted onto the outer surface of the housing, and wherein several corresponding shapes are arranged on the outer surface with a respective longitudinal spacing between each shape. The respective protrusions may then have a larger radial and circumferential extension than the extensions connecting the adjacent protrusions, potentially also having a larger axial extension. By the same token, such shapes may also be connected to each other in the longitudinal direction to form a single structure that is coupled to or integrated with the outer surface of the housing.

Preferably, one or more protrusions comprise one or more surface irregularities configured to deflect and/or impair a fluid flowing in an upstream direction and through the corresponding cavity.

The surface irregularities may be formed to e.g. disrupt a laminar flow only in a flow direction towards the supply of the combustible fluid and hence to cause turbulences. Such turbulences may not only facilitate the heat absorption from the fluid entering the pre-chamber by the protrusions, but also restrict the flow towards the supply. The surface irregularities preferably comprise a droplet shape and/or may be configured to define a Tesla valve or similar structure to support flow towards a downstream valve while impairing flow towards an upstream gas inlet and/or supply of a combustible fluid. The surface irregularities may hence also provide different, direction-dependent flow resistances for a fluid entering the pre-chamber in a reverse direction based on the corresponding geometry.

A ratio between the extension of a respective cavity in the radial direction or longitudinal direction and the circumferential direction of the housing is preferably between 20:1 and 1.1:1, preferably between 10:1 and 2:1. Preferably, the extension of a respective cavity in a circumferential direction of the housing is between about 0.1 mm and 5 mm, preferably between 0.3 mm and 0.7 mm, and/or the extension of a respective cavity in a radial direction is preferably between about 0.2 mm and 5.0 mm, preferably between 0.4 mm and 2 mm.

The preferred ratios and absolute dimensions have been found to be particularly advantageous in providing a heat conducting surface and restricting a flow in a direction upstream of the first end of the channel so as to reduce the risk of flashing or re-ignition in the pre-chamber. At the same time, such ratios and absolute dimensions have been found to support a predefined volume flow towards a downstream valve and combustion area.

Preferably, the protrusions are dimensioned to be in contact with an inner surface of a wall of a body accommodating the arrangement or to define a radial spacing between the inner surface and the respective protrusion, said spacing being equal to or smaller than an extension of a respective cavity in the circumferential direction, in the mounted state of the arrangement.

For instance, a direct contact may provide an interference fit, which may facilitate the mounting of the arrangement into the pre-chamber and further (fully) restricts any fluid flow at the interface between the protrusions and the inner surface of the wall. However, a predefined spacing may also be provided, which may facilitate e.g. a screwing fixation or other fixation by establishing some tolerance yet which is also sufficient to restrict a fluid flow to prevent or minimize the risk of backfiring, re-ignition or flame developments.

The protrusions may not only be formed as (partially) longitudinally or axially extending ribs or fins, but may also form a layered mesh-like structure or an at least partially helical structure. A mesh-like structure has the advantage of providing a large surface to volume ratio, which is advantageous for the efficiency as a flame arrester and/or to avoid backfiring.

Such mesh-like structure may e.g. be formed by a number of layers of protrusions, each layer comprising a plurality of protrusions that are (evenly) spaced apart in the circumferential direction, wherein the layers are spaced apart in the axial or longitudinal direction and wherein the protrusions of adjacent layers are e.g. arranged in a staggered formation with regard to each other in the circumferential direction.

The longitudinal extension of the protrusions in each layer may preferably correspond to a longitudinal spacing between the layers or may also be smaller. For example, each layer may be formed of a sheet material having a plurality of cavities, wherein the thickness of the sheet is smaller than the respective width of the cavities. In order to provide a sufficient flow path during normal operation, the longitudinal spacing may hence be larger to avoid potential pressure build-ups while increasing the residing time and the flow path length. Thereby, the efficiency of heat absorption and a potential flame retardation or extinguishing may be further improved without impairing normal flow behavior directed to a downstream valve.

Furthermore, a pre-chamber for a combustion engine is suggested, comprising an arrangement as described in the above and a body having a wall defining an inner surface and accommodating the arrangement within said wall, wherein the wall comprises a gas inlet and a gas outlet, the gas inlet being arranged upstream of the at least one protrusion and the gas outlet being fluidly connectable to the second end of the channel via a pre-chamber gas valve.

The body may be mountable to the combustion engine, e.g. via a thread of the body to provide a screwing engagement, and may be formed of a solid (metal) material. The body is preferably configured to form an essentially continuous interface with a corresponding surface of one or more components of the combustion engine, when in the mounted state, such that heat transfer is established directly between the respective component and the body. The dimensioning of the body and the arrangement may be adapted to the heat generated by the downstream combustion area or portion, e.g. during normal or nominal operation, and the heat transfer provided via the body towards the one or more adjacent components of the combustion engine.

The protrusions may be in contact with the inner surface of the wall or define a radial spacing between the inner surface and the protrusions, said spacing being equal to or smaller than an extension of a respective cavity in the circumferential direction. For instance, a direct contact may provide an interference fit, which may facilitate the mounting of the arrangement into the pre-chamber and further (fully) restricts any fluid flow at the interface between the protrusions and the inner surface of the wall. However, a predefined spacing may also be provided, which may facilitate e.g. a screwing fixation or other fixation by establishing some tolerance yet which is also sufficient to restrict a fluid flow to prevent or minimize the risk of backfiring, re-ignition or flame developments.

The protrusions are preferably arranged and/or shaped to provide a fluid communication between the gas inlet and the first end of the channel. Accordingly, the protrusions do not block the normal flow of the combustible fluid, but may be arranged and/or configured to divert or deflect a fluid entering the pre-chamber in a reverse direction via the downstream valve or only restrict the fluid flow in said reverse direction. Thereby, the residing time of such fluid within the pre-chamber may be increased providing an improved heat absorption and/or a reduced penetration depth.

Preferably, the gas inlet and gas outlet are respectively arranged at perpendicular or opposing wall sections. In such manner, the flow path of a combustible fluid may be further increased, which is advantageous for improving the heat transfer to a fluid entering the pre-chamber via the downstream valve, yet without causing undesirable pressure build-ups during normal operation.

Furthermore, a combustion engine is suggested, preferably a gas engine, comprising a pre-chamber as described in the above.

INDUSTRIAL APPLICABILITY

With reference to the Figures, an arrangement for a pre-chamber gas valve of a combustion engine as well as a corresponding pre-chamber and a combustion engine equipped with such pre-chamber are suggested. The suggested arrangement as mentioned above is applicable in a variety of engines, such as gas engines, which require additional safety measures to avoid a backfiring, e.g. in case of a dysfunctional gas valve. Further, the arrangement may be mounted into existing pre-chambers or the pre-chamber as a whole may be replaced with a pre-chamber configured for the arrangement as a replacement or retrofit part, which may be exchanged e.g. upon or prior to overhaul or prior to use.

The invention claimed is:

1. An arrangement for a pre-chamber gas valve of a combustion engine, comprising:
    a housing having an outer surface and comprising a channel, a first end of the channel being in fluid communication with the outer surface, and a second end of the channel being connectable to a valve seat of the pre-chamber gas valve, and
    a plurality of protrusions extending radially outward from the outer surface of the housing,
    wherein the first end of the channel is arranged upstream of the second end of the channel and downstream of the protrusions, wherein the protrusions are spaced apart from each other in a circumferential direction and define a respective cavity between respective adjacent protrusions, each cavity having an extension being larger in a radial direction and/or axial direction than an extension in the circumferential direction, wherein the protrusions are configured to establish an interference fit with an inner wall of a pre-chamber body to fully restrict fluid flow between the protrusions and the inner wall.

2. The arrangement according to claim 1, wherein the housing and/or the protrusions are formed as a solid body, preferably made of a ceramic and/or metal.

3. The arrangement according to claim 1, wherein the protrusions are integrally formed with the housing or are formed from a single piece with the housing.

4. The arrangement according to claim 1, wherein the protrusions extend in an axial direction of the housing and/or along a circumferential direction of the housing.

5. The arrangement according to claim 1, wherein at least a portion of the protrusions is spaced apart in an axial direction of the housing.

6. The arrangement according to claim 1, wherein one or more protrusions comprise one or more surface irregularities configured to deflect and/or impair a fluid flowing in an upstream direction and through the corresponding cavity.

7. The arrangement according to claim 1, wherein a ratio between the extension of a respective cavity in the radial direction or longitudinal direction and the circumferential direction of the housing is between 20:1 and 1.1:1.

8. The arrangement according to claim 1, wherein the extension of a respective cavity in a circumferential direction of the housing is between about 0.1 mm and 5 mm, and/or wherein the extension of a respective cavity in a radial direction is between about 0.2 mm and 5.0 mm.

9. The arrangement according to claim 1, wherein the protrusions are dimensioned to be in contact with an inner surface of a wall of a body accommodating the arrangement or to define a radial spacing between the inner surface and the respective protrusion, said spacing being equal to or smaller than an extension of a respective cavity in the circumferential direction, in the mounted state of the arrangement.

10. The arrangement according to claim 1, wherein the protrusions form a layered mesh-like structure or an at least partially helical structure.

11. A pre-chamber for a combustion engine, comprising:
    an arrangement according to claim 1,
    a body having a wall defining an inner surface and accommodating the arrangement within said wall, wherein the wall comprises a gas inlet and a gas outlet, the gas inlet being arranged upstream of the protrusions and the gas outlet being fluidly connectable to the second end of the channel via a pre-chamber gas valve.

12. The pre-chamber according to claim 11, wherein the protrusions are in contact with the inner surface or wherein the protrusions define a radial spacing between the inner surface and the protrusions, said spacing being equal to or smaller than an extension of a respective cavity in the circumferential direction.

13. The pre-chamber according to any of claim 11, wherein the protrusions are arranged and/or shaped to provide a fluid communication between the gas inlet and the first end of the channel via the corresponding cavities.

14. The pre-chamber according to any of claim 11, wherein the gas inlet and gas outlet are respectively arranged at perpendicular or opposing wall sections.

15. A combustion engine, comprising a pre-chamber according to claim 11.

16. The arrangement according to claim 1, wherein a ratio between the extension of a respective cavity in the radial direction or longitudinal direction and the circumferential direction of the housing is between 10:1 and 2:1.

17. The arrangement according to claim 1, wherein the extension of a respective cavity in a circumferential direction of the housing is between 0.3 mm and 0.7 mm, and/or wherein the extension of a respective cavity in a radial direction is between 0.4 mm and 2 mm.

* * * * *